Nov. 24, 1964  A. F. CURTISS  3,158,285
WELDED BAIL EAR WITH SEGMENTED FLANGE
Filed Oct. 31, 1962
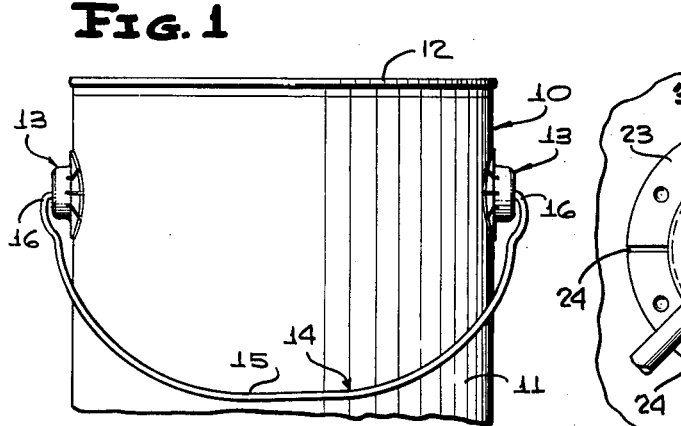
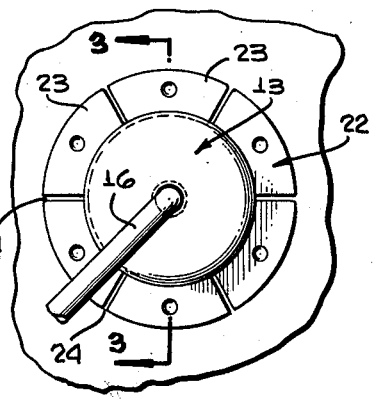
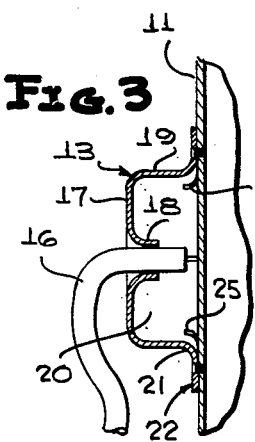
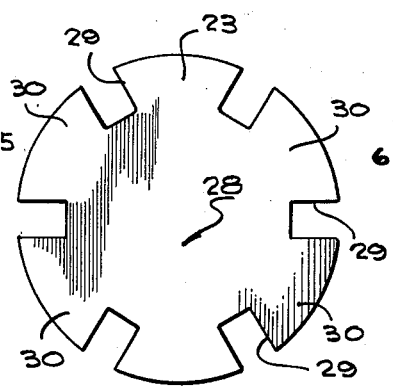
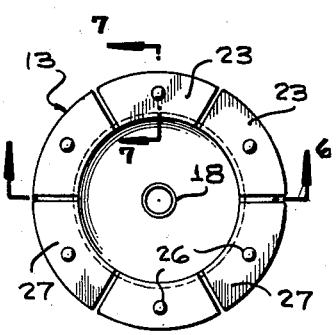
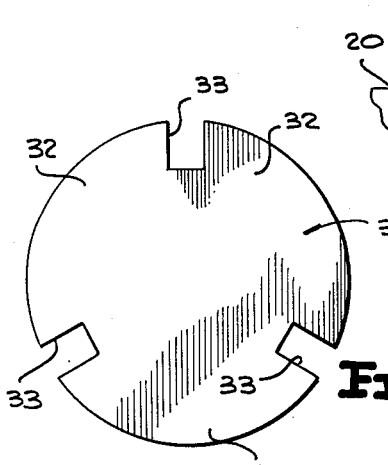
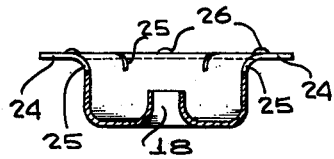
INVENTOR
ALAN F. CURTISS
BY
ATTORNEYS

United States Patent Office 3,158,285
Patented Nov. 24, 1964

3,158,285
WELDED BAIL EAR WITH SEGMENTED FLANGE
Alan F. Curtiss, La Grange, Ill., assignor to Continental Can Company, Inc., New York, N.Y., a corporation of New York
Filed Oct. 31, 1962, Ser. No. 234,416
2 Claims. (Cl. 220—91)

This invention relates to bail ears including segmented flanges adapted to be spot welded to a container body, and in particular to metallic bail ears which have a plurality of weep holes in the flanges thereof which perform the dual function of preventing water from being trapped in the bail ears, and additionally provide for the partial insertion therein of a shipping identification tag.

In the manufacture of containers or cans having bail ears spot welded to an upper part of the containers, after the spot welding operation, the containers are tested to detect leaks at the weld points.

A method of detecting the presence of leaks after the above-mentioned welding operation is to subject the interior of a container to pressurized air while the container is submerged below the surface of a body of water. Typically, a plurality of containers or cans are transported by a conveyor to a tank or vat of water. One end of each of the containers is open and a plate is placed in sealing contact with the open end. The plate is suitably apertured for placing the interior of the container in communication with a source of pressurized air. As the conveyor submerges each of the containers below the surface of the water in the tank, defective containers can be immediately identified by the presence of air bubbles on the surface of the water as the air within the container escapes through leaks at the weld points of the bail ears and the container body, and rises to the surface of the water in a stream of bubbles. The defective container may be removed from the conveyor and discarded by an operator. Containers which are free of defects continue along the conveyor for subsequent filling.

During the time that the containers are submerged in the tank, water enters into the interiors of the bail ears through the conventional bail trunnions thereof. When the containers are removed from the tank, the water is trapped within the interiors of the bail ears. This trapped water results in the subsequent rusting of the bail ears and causes the bail ears to break away from the containers when the containers are subsequently filled and carried by conventional bails journaled in the bail ears.

In the specific case of a conventional water pail having a plurality of bail ears welded to a top part thereof, it should be appreciated that water is trapped within the interior of the bail ears when the pail is inspected in the manner disclosed above, and in addition, each time the pail is immersed into water. Repeated immersion of the pail over a period of time rapidly increases the amount of rusting of the bail ears and, consequently, shortens the life-time of the pail.

An object of this invention is to avoid the above-mentioned disadvantages inherent in conventional container and bail ear structures.

An object of this invention is to provide a welded bail ear with a segmented flange having a plurality of weep holes which prevent water from being trapped in the bail ear, and thereby prevent subsequent rusting of the bail ear.

Another object of the invention is to provide a bail ear formed from a metallic disk which is radially notched to form a plurality of flange segments, and subsequently drawn to the desired bail ear configuration.

Another object of the invention is the provision of a bail ear constructed from a metallic disk having a plurality of radial notches dimensioned to form a radially extending segmented flange whereby the flange will readily conform to the external contour of the container or can body during the welding of the bail ear to the body.

Still another object of this invention is to provide a bail ear having a plurality of flange segments wherein each segment includes a projecting nib or embossment to facilitate spot welding of each of the flanged segments to an external wall of a container or can body.

Another object of this invention is to provide a bail ear with a plurality of weep holes which perform the dual function of preventing water from being trapped in the bail ear and of providing means into which a shipping identification tag may be partially inserted.

A further object of this invention is to provide a method for fabricating a bail ear from a metallic disk and securing the same to an external wall of a container or can body.

With the above, and other objects in view that will hereinafter appear, the nature of the invention will be more clearly understood by reference to the following detailed description, the appended claims and the several views illustrated in the accompanying drawing.

In the drawing:

FIGURE 1 is a fragmentary elevational view of a container having a bail pivotally connected thereto by a pair of identical metallic bail ears secured to the container adjacent an upper part thereof in diametrically opposed relationship to each other, the bail having an end pivotally attached to each of the bail ears.

FIGURE 2 is an enlarged fragmentary elevational view of an upper part of the container and one of the metallic bail ears shown in FIGURE 1, and illustrates the bail ear secured adjacent the upper end of the container by a spot weld located substantially medially of each of a plurality of flange segments of a segmented flange.

FIGURE 3 is a vertical sectional view taken along line 3—3 of FIGURE 2 and illustrates a plurality of weep holes in a segmented flange of the bail ear, and a trunnion of the bail ear pivotally receiving an end of the bail.

FIGURE 4 is a plan view of a bail ear disk from which the bail ear of FIGURES 2 and 3 is constructed, and illustrates a plurality of radial notches and flange segments prior to forming the bail ear disk into the bail ear.

FIGURE 5 is a bottom view of the bail ear shown in FIGURE 2, and illustrates the underside of the bail ear and each of a plurality of projecting nibs or embossments disposed medially of each of the plurality of flange segments of the segmented flange.

FIGURE 6 is a diametrical sectional view through the bail ear taken along line 6—6 of FIGURE 5, and more clearly illustrates the radial extent of a plurality of radial notches in a segmented flange of a bail ear.

FIGURE 7 is a fragmentary cross-sectional view taken along line 7—7 of FIGURE 5, and illustrates a single integral nib or embossment projecting from a container abutting surface of a flange segment.

FIGURE 8 is a plan view of a modified form of bail ear disk, similar to the bail ear disk shown in FIGURE 4, having three equally circumferentially spaced radial notches and flange segments from which a modified bail ear is constructed.

A container or can 10 including a cylindrical tubular body 11 and an upper end 12 is illustrated in FIGURE 1. A pair of identical bail ears 13 are secured adjacent the upper end 12 of the body 11 by spot welding, soldering or a like metal joining process. The bail ears 13 are secured adjacent the upper end 12 of the body 11 in diametrically opposed relationship, and a resilient bail 14 having a handle portion 15 and identical ends 16, is pivotally attached by the ends 16 to the bail ears 13.

Each of the identical bail ears 13 includes a substantially circular face wall 17 and an integral centrally inwardly directed trunnion 18. As is best illustrated in FIGURE 3, the trunnion 18 receives and pivotally cooperates with the bail end 16. A peripheral wall 19 is integrally joined to the face wall 17, and with the face wall 17 forms a recessed bail interior 20. An annular radius 21 joins the peripheral wall 19 to an outwardly radally flared segmented flange 22. The annular radius 21 constitutes an integral, radially innermost portion of the segmented flange 22.

The segmented flange 22 consists of a plurality of identical arcuate flange segments 23 separated by a plurality of identical radial notches 24. As is best illustrated in FIGURE 2, there are six identical circumferentially disposed flange segments 23 and radial notches 24. Each radial notch 24 traverses the entire radial extent of the segmented flange 22, including the integral annular radius 21 thereof.

The portions of the radial notches 24 within the radius 21 define a plurality of weep holes 25 which provide access between the recessed interior 20 of the bail ear 13 and the surrounding atmosphere. The weep holes 25 permit free drainage of water from the recessed interior 20 and thereby prevent water from being trapped within the recessed interior 20 of the bail ear 13 to therefore preclude subsequent rusting of the bail ear 13. An additional function of the weep holes 25 is to provide for the insertion therein of a shipping identification tag.

Each of the flange segments 23 includes an identical, integral, centrally located nib or embossment 26. Each nib or embossment 26 projects outwardly from a container abutting surface 27 of each of the flange segments 23, as is best shown in FIGURE 7. The bail ears 13 are secured to the container body 11 by a spot welding operation during which the nibs or embossments 26 are subjected to external heat and pressure. As is best illustrated in FIGURE 3, the pressure exerted during the spot welding operation flattens each of the nibs 26 against the container body 11 and conforms the segmented flange 22 to the external configuration of the body 11. Thus, a more efficient and longer lasting connection between the bail ear 13 and the body 11 than heretofore possible is achieved.

A bail ear, such as the bail ear 13, is fabricated from a sheet metal blank (not shown) of a gauge which may be easily blanked and drawn. The sheet metal blank is blanked to form a substantially circular bail ear disk 28 and is provided with a plurality of identical radial notches 29, six such notches 29 being shown in FIGURE 4. The radial notches 29 of the disk 28 circumferentially divide the disk 28 into six identical arcuate flange segment forming portions 30. The radial notches 29 are greater in width and lesser in length than the radial notches 24 of the completely fabricated bail ear 13, illustrated in FIGURES 2, 3 and 5. The reason for dimensioning the notches 29 as illustrated in FIGURE 4 is to compensate for the deformation of the flange segment forming portions 30 of the disk 28 when the disk 28 is drawn to the contour of a bail ear, such as the bail ear 13.

During the drawing operation, the metallic bail ear disk 28 is deformed or stretched to the configuration of the bail ear illustrated in FIGURES 2, 3 and 5. As the bail ear 13 is being drawn, the axial length thereof is elongated or stretched. This axial elongation of the bail ear 13 causes the radial length of the notches 29 of the bail ear disk 28 to increase, thereby forming the weep holes 25. Furthermore, the formation of the face wall 17 and the peripheral wall 19 causes the bail ear disk 28 to decrease in diameter whereby the notches 29 are circumferentially narrowed by the deformation of adjacent flange segments 30 towards each other.

Inasmuch as the amount of deformation or stretching of the bail ear disk 28 varies with such factors as the height, diameter and gauge of metal of the desired bail ear, an alternative step in the above method of forming the weep holes 25 is to dimension the lengths of the notches 29 of the bail ear disk 28 to the combined radial dimensions of the flange segments 23 and the annular radius 21 of the bail ear 13. This above-mentioned dimensioning precludes the drawing of a bail ear without weep holes and in no way depends upon the stretching of the bail ear disk for the formation of the weep holes.

The trunnion 18 and the nibs 26 may be formed prior to, simultaneously with or after the drawing of the disk 28 to the desired configuration of the bail ear.

The completely fabricated bail ear may then be secured adjacent the upper end 12 of the body 11 by a spot welding, soldering or brazing operation. The pressure of the spot welding operation flattens the nibs 26 against the body 11 of the container 10, as heretofore mentioned, and conforms the individual flange segments 23 to the external configuration of the body 11. Because the flange 22 is segmented, each flange segment 23 thereof has its respective abutting surface 27 in face-to-face contact with the body 11.

A metallic bail ear disk 31, which is a modification of the bail ear disk 28 of FIGURE 4, is illustrated in FIGURE 8. The bail disk 31 differs from the bail disk 28 in that there are only three identical arcuate flange segment forming portions 32 equally peripherally disposed about the disk 31, and three identical radial notches 32. A bail ear fabricated from the disk 31 is similar to the bail ear 13 except that the completely formed bail ear has only three flange segments and three radial notches. From the above disclosure, it is readily apparent that various modifications in the disclosure construction of a bail ear would be obvious to one skilled in the art, and therefore, this disclosure is considered exemplary only and not limited to the specifically disclosed bail ears. For example, a bail ear having a segmented flange and only a single radial notch and weep hole is within the scope of this invention. Further, if desired, the nibs on the flange segments may be eliminated and the flange segments secured to the can by other welding methods or by soldering.

Therefore, while example disclosures of bail ears with segmented flanges and weep holes are shown herein, it is to be understood that changes in the disclosed structures and arrangements may be made without departing from the spirit and scope of the invention, as defined in the appended claims.

I claim:

1. A bail ear comprising a bail-receiving recessed boss, a segmented flange integrally joined to said boss by an annular shoulder, a plurality of radial notches in said segmented flange separating a plurality of flange segments and each of said notches terminating within said annular shoulder thereby forming weep holes which prevent water from being trapped in the bail ear after the bail ear is secured to a container and in whatever rotational position the bail ear is so secured to a container.

2. The combination of a container having a body including an external wall surface, and a plurality of bail ears having recessed interiors, each of said bail ears including a peripheral segmented flange secured to the external wall surface of the body, an annular shoulder forming an integral portion of said segmented flange, said shoulder being displaced from said external wall surface, and a plurality of circumferentially spaced radial notches in said segmented flange terminating within said shoulder thereby forming a plurality of weep holes which prevent water from being trapped in the recessed interior of each of the bail ears.

References Cited in the file of this patent

UNITED STATES PATENTS

| | | | |
|---|---|---|---|
| 24,451 | Evans | June 21, | 1859 |
| 1,020,056 | Rietzel | Mar. 12, | 1912 |
| 1,433,881 | Fancher et al. | Oct. 31, | 1922 |
| 1,595,564 | Neuhaus | Aug. 10, | 1926 |
| 1,670,131 | Allerton | May 15, | 1928 |
| 2,088,605 | McCarthy | Aug. 3, | 1937 |
| 2,332,175 | Sinclair | Oct. 19, | 1943 |

FOREIGN PATENTS

| | | | |
|---|---|---|---|
| 1,139,728 | France | Feb. 18, | 1957 |